United States Patent
Enstad

(10) Patent No.: US 12,256,173 B1
(45) Date of Patent: Mar. 18, 2025

(54) METHOD TO CONTROL MULTIPLE CAMERAS IN A CONFERENCE ROOM BASED ON AUDIO TRACKING AND HEAD DETECTION DATA

(71) Applicant: Cisco Technology, Inc., San Jose, CA (US)

(72) Inventor: Gisle Langen Enstad, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 212 days.

(21) Appl. No.: 17/943,433

(22) Filed: Sep. 13, 2022

(51) Int. Cl.
| | |
|---|---|
| H04N 7/15 | (2006.01) |
| G06T 7/70 | (2017.01) |
| G10L 25/06 | (2013.01) |
| G10L 25/57 | (2013.01) |
| G10L 25/78 | (2013.01) |
| H04L 65/403 | (2022.01) |
| H04N 5/268 | (2006.01) |
| H04R 1/40 | (2006.01) |
| H04R 3/00 | (2006.01) |

(52) U.S. Cl.
CPC ............ H04N 7/15 (2013.01); G06T 7/70 (2017.01); G10L 25/06 (2013.01); G10L 25/57 (2013.01); G10L 25/78 (2013.01); H04L 65/403 (2013.01); H04N 5/268 (2013.01); H04R 1/406 (2013.01); H04R 3/005 (2013.01); G06T 2207/10016 (2013.01); G06T 2207/30201 (2013.01)

(58) Field of Classification Search
None
See application file for complete search history.

(56) References Cited

U.S. PATENT DOCUMENTS

| | | | |
|---|---|---|---|
| 7,969,472 B2 | 6/2011 | Biegelsen et al. | |
| 9,633,270 B1* | 4/2017 | Tangeland | H04N 7/15 |
| 2010/0123770 A1 | 5/2010 | Friel et al. | |
| 2012/0320143 A1* | 12/2012 | Chu | H04N 7/15 |
| | | | 348/E7.083 |

(Continued)

OTHER PUBLICATIONS

Ranjan et al., "Automatic Camera Control Using Unobtrusive Vision and Audio Tracking," Graphics Interface Conference 2010, May 31-Jun. 2, 2010, 8 pages.

(Continued)

*Primary Examiner* — Quoc D Tran
(74) *Attorney, Agent, or Firm* — Edell, Shapiro & Finnan, LLC

(57) ABSTRACT

A method comprises, at a video conference system having cameras and microphone arrays each co-located with a corresponding one of the cameras: detecting a face of a participant, and estimating orientations of the face relative to the cameras, based on video captured by the cameras; receiving, from each of the microphone arrays, at least two microphone signals that represent detected audio from the participant; separately correlating the at least two microphone signals from each of the microphone arrays against each other using a correlation function, to produce correlation peaks for the microphone arrays corresponding to the microphone arrays and the cameras; determining a preferred camera among the cameras based on the correlation peaks and the orientations of the face relative to the cameras; and transmitting the video captured by the preferred camera to a network.

20 Claims, 8 Drawing Sheets

(56) References Cited

U.S. PATENT DOCUMENTS

| | | | |
|---|---|---|---|
| 2016/0057385 A1* | 2/2016 | Burenius | H04N 7/147 348/14.16 |
| 2017/0310933 A1 | 10/2017 | Vendrow | |
| 2018/0070053 A1 | 3/2018 | Feng | |
| 2019/0158733 A1* | 5/2019 | Feng | H04N 23/695 |
| 2020/0154077 A1 | 5/2020 | Bender et al. | |
| 2022/0408015 A1* | 12/2022 | Wang | H04N 7/147 |

OTHER PUBLICATIONS

Gatica-Perez et al., "A Mixed-State I-Particle Filter for Multi-Camera Speaker Tracking," Research Gate, https://www.researchgate.net/publication/37433094_A_Mixed-State_I-Particle_Filter_for_Multi-Camera_Speaker_Tracking, published Jan. 2003, 19 pages.

Knapp et al., "The Generalized Correlation Methoq for Estimation of Time Delay," IEEE Transactions On Acoustics, Speech, and Signal Processing, vol. ASSP-24, No. 4, Aug. 1976, 8 pages.

Biegelsen, et al., "Automatic Camera Steering Control And Video Conferencing," Acoustical Society of America Journal. 130. 4178-. 10.1121/1.3669032, Jan. 2011, 1 page.

Wang, et al. "Robust Automatic Video-Conferencingwith Multiple Cameras and Microphones," Division of Engineering and Applied Sciences, https://ieeexplore.ieee.org/document/871072, Jul. 30, 2000-Aug. 2, 2000, 4 pages.

Creston, Products / Workspace Solutions (/Products/Workspace-Solutions) / Intelligent Video (/Products/Workspace-Solutions/Intelligent-Video) / 1 Beyond Intelligent Video, https://www.crestron.com/Products/Workspace-Solutions/Intelligent-Video, retrieved Aug. 25, 2022, 12 pages.

Multicam Conf—multiCAM systems, "Automated Video Conferencing Create engaging, professional videos with no operator required," https://www.multicam-systems.com/all-in-one-solutions/multicam-conf/, retrieved Sep. 13, 2022, 5 pages.

Trueconf, Multiple camera video conferencing software for Large Rooms, Multiple camera video conferencing—TrueConf Weathervane, https://trueconf.com/products/weathervane.html, retrieved Sep. 13, 2022, 9 pages.

Blamp, Cornerstone, "TechnicalSupport Knowledge Base Chat with Biamp tech support," https://support.biamp.com/Design_Library/Conference_Rooms/Conference_room_with_AEC_and_automatic_camera_control, Conference room with AEC and automatic camera control, Jan. 18, 2021, 9 pages.

AREC Inc., I AV-over-IP Solutions, "AREC Speaker Tracking System," https://www.arec.com/speaker_tracking-en.html, retrieved Sep. 13, 2022, 6 pages.

Trivedi et al., UC San Diego UC San Diego Previously Published Works, "Dynamic context capture and distributed video arrays for intelligent spaces," https://escholarship.org/uc/item/7nj98769, IEEE Transactions On Systems, Man, and Cybernetics—Part A: Systems and Humans, vol. 35, No. 1, Jan. 2005, 20 pages.

Yoshimi et al., "A Multimodal Speaker Detection and Tracking System for Teleconferencing, " https://dl.acm.org/doi/abs/10.1145/641007.641100, Dec. 1, 2002, 2 pages.

* cited by examiner

US 12,256,173 B1

METHOD TO CONTROL MULTIPLE CAMERAS IN A CONFERENCE ROOM BASED ON AUDIO TRACKING AND HEAD DETECTION DATA

TECHNICAL FIELD

The present disclosure relates to processing video of, and audio from, a talker to select an active video camera in a conference space.

BACKGROUND

A video conference system may include multiple video cameras deployed in a large meeting or conference room to capture optimum views of local participants engaged in a video conference. A common technique for selecting and controlling the video cameras uses fixed video camera pre-sets or pre-configurations. The technique triggers an appropriate one of the camera pre-sets based on voice activity detected on microphones also deployed in the conference room, and associated with the video cameras. For example, when the video conference system detects voice activity associated with a given microphone, the video conference system triggers a selection of one of the camera presets also associated with the given microphone to capture video of the talker. This technique is inflexible because the camera pre-sets are fixed and may not capture best dynamic views of the talker.

DETAILED DESCRIPTION

Overview

In an embodiment, a method comprises: at a video conference system having cameras and microphone arrays each co-located with a corresponding one of the cameras: detecting a face of a participant, and estimating orientations of the face relative to the cameras, based on video captured by the cameras; receiving, from each of the microphone arrays, at least two microphone signals that represent detected audio from the participant; separately correlating the at least two microphone signals from each of the microphone arrays against each other using a correlation function, to produce correlation peaks for the microphone arrays corresponding to the microphone arrays and the cameras; determining a preferred camera among the cameras based on the correlation peaks and the orientations of the face relative to the cameras; and transmitting the video captured by the preferred camera to a network.

Example Embodiments

Figure 1:
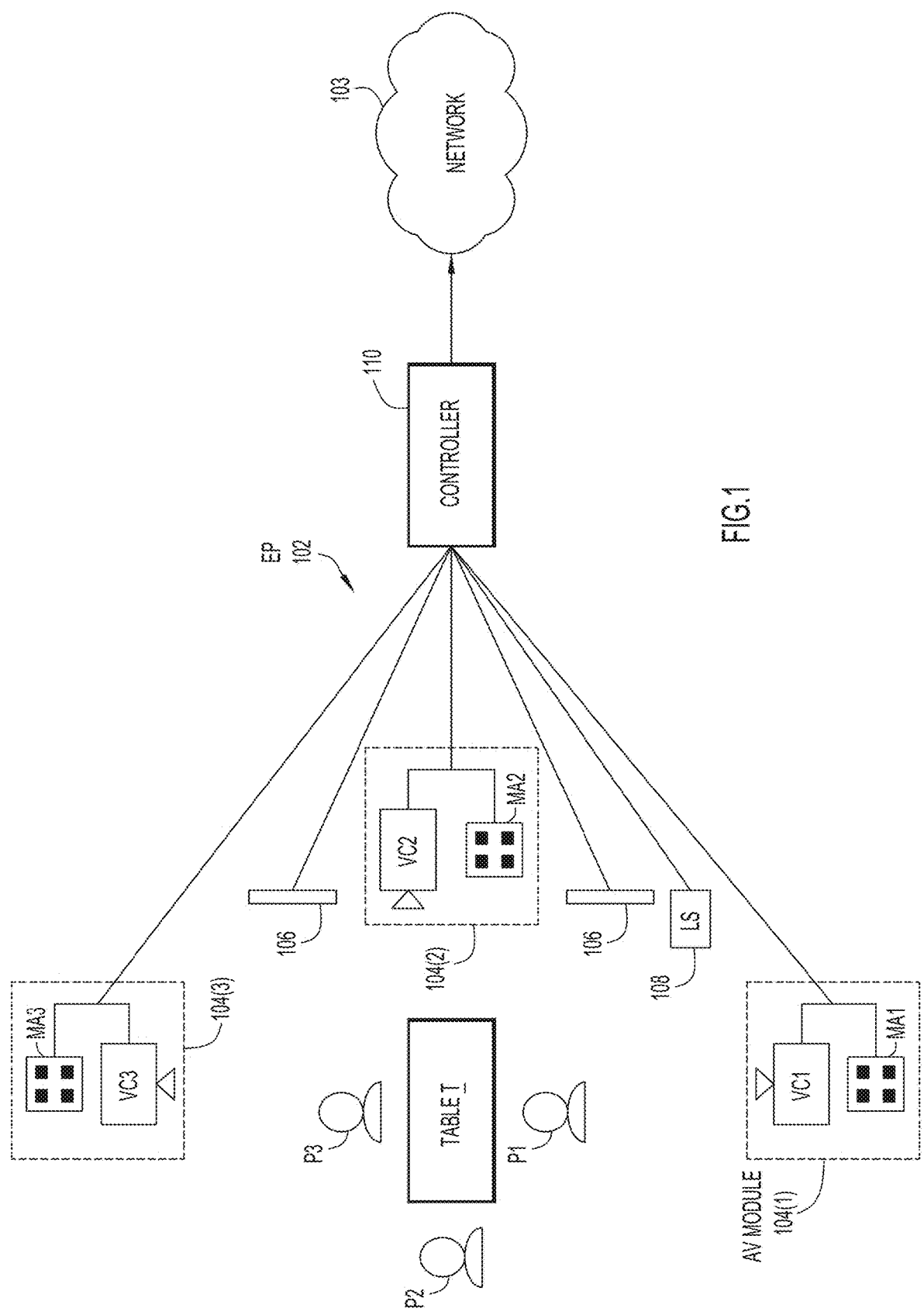
FIG. 1 is an illustration of a video conference (e.g., teleconference) endpoint deployed in a room with participants/talkers, according to an example embodiment.

With reference to FIG. 1, there is an illustration of an example video conference (e.g., teleconference) system or endpoint (EP) 102 (referred to simply as "endpoint 102") in which processing video of, and audio from, a talker to select an active video camera in a conference space may be implemented. Endpoint 102 is deployed in an acoustic environment, such as a conference room, and is operated by local participants/talkers P1, P2, and P3 (collectively referred to as participants P) seated around a table T. There may be more or less than three participants P. Endpoint 102 is configured to establish audio-video teleconference collaboration sessions (e.g., video conferences) with other endpoints over a communication network 103, which may include one or more wide area networks (WANs), such as the Internet, and one or more local area networks (LANs). Endpoint 102 may be a wired and/or a wireless communication device, such as, but not limited to a laptop or tablet computer, a smartphone, a dedicated teleconference system, and the like.

Endpoint 102 includes multiple audio-video (AV) modules 104(1), 104(2), and 104(3) (collectively referred to as AV modules 104), video displays 106, and a loudspeaker (LS) 108 connected to, and configured to exchange signals with, a controller 110. AV modules 104 each includes a video camera with a field-of-view (FOV) to capture video of one or more of participants P and a corresponding microphone array co-located with the video camera to detect audio (e.g., voice) originated by the participants when they are talking. AV modules 104 are spaced-apart from each other and arranged around the conference room to detect audio from and capture video of participants P from different vantage points and orientations. There may be more or less than three AV modules.

In the example of FIG. 1, AV module 104(1) includes video camera VC1 co-located with corresponding microphone array MA1, AV module 104(2) includes video camera VC2 co-located with corresponding microphone array MA2, and AV module 104(3) includes video camera VC3 co-located with corresponding microphone array MA3. Each microphone array MAi may be fixed to its corresponding video camera VCi, for example. Video cameras VC1-VC3 respectively capture video in their fields-of-view and provide the captured video (also referred to simply as "video") to controller 110 via video signals or feeds. Controller 110 processes the video according to embodiments presented herein.

Microphone arrays MA1-MA2 respectively detect sound impinging on individual microphones of the microphone arrays to produce individual microphone signals, and provide the individual microphone signals to controller 110. More specifically, each microphone array MAi includes at least two spaced-apart individual microphones. In some examples, each microphone array MAi may include a onedimensional (1D) array or a two-dimensional (2D) array of the individual microphones. Each individual microphone in each microphone array MAi converts sound impinging on the individual microphone to an individual microphone signal and provides the individual microphone signal to controller 110. Thus, each microphone array MAi provides multiple microphone signals to controller 110, which processes the microphone signals according to embodiments presented herein.

The example of FIG. 1 shows controller 110 implemented as a centralized controller that receives the video feeds and microphone signals from AV modules 104, and performs centralized audio and video processing of the aforementioned signals. In an alternative example, controller 110 may be implemented as a distributed controller having audio and video processing modules/components distributed across/integrated with each of AV modules 104, as will be described below in connection with FIG. 3B.

Figure 2:
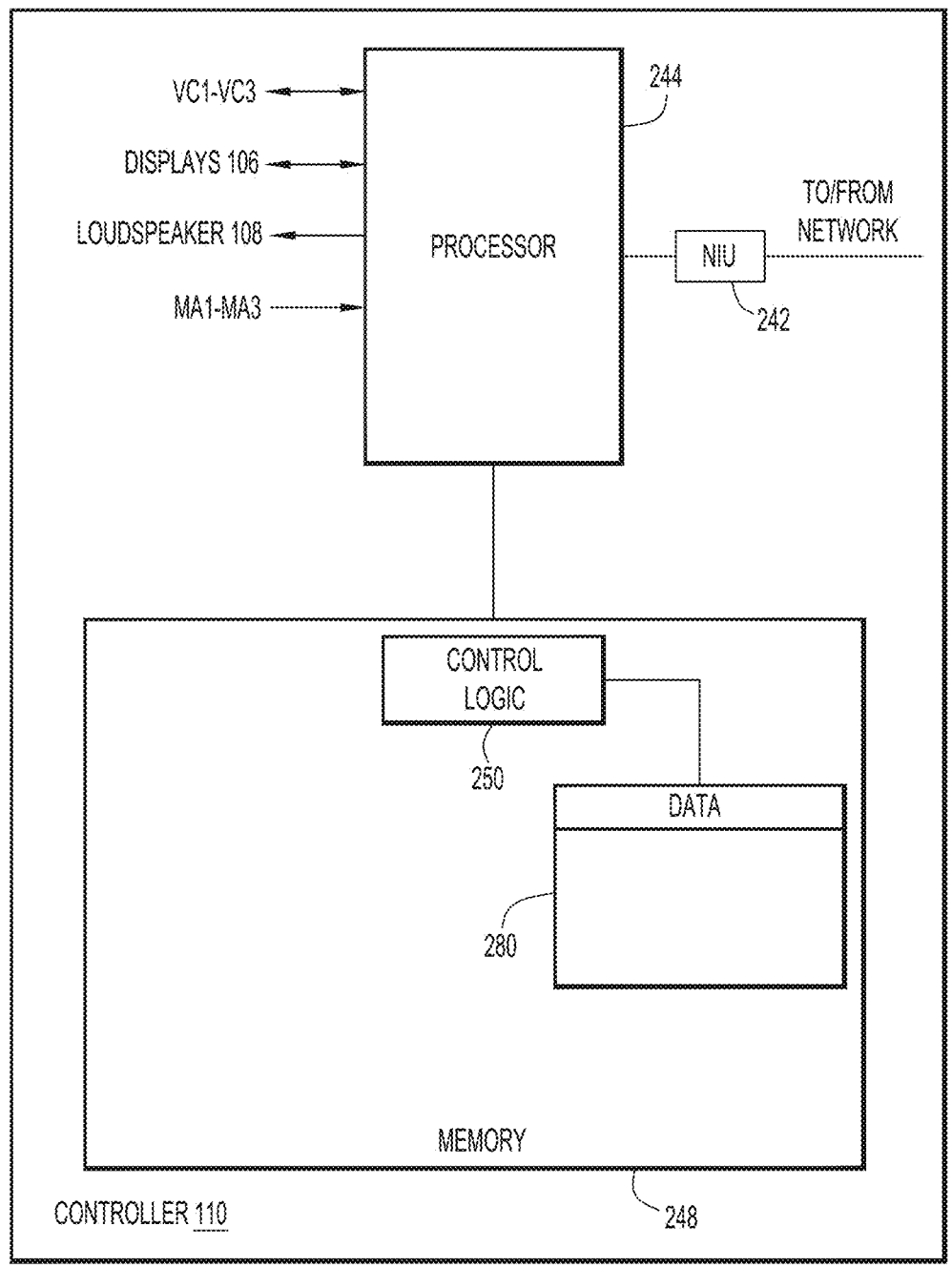
FIG. 2 is block diagram of a controller of the video conference endpoint, according to an example embodiment.

Reference is now made to FIG. 2, which is a block diagram of controller 110 according to an embodiment. There are numerous possible configurations for controller 110 and FIG. 2 is meant to be an example. Controller 110 includes a network interface unit 242, a processor 244, and memory 248. The aforementioned components of controller 110 may be implemented in hardware, software, firmware, and/or a combination thereof. The network interface (I/F) unit (NIU) 242 is, for example, an Ethernet card or other interface device that allows the controller 110 to communicate over communication network 103. Network I/F unit 242 may include wired and/or wireless connection capability.

Processor 244 may include a collection of microcontrollers and/or microprocessors, for example, each configured to execute respective software instructions stored in the memory 248. The collection of microcontrollers may include, for example: a video controller to receive, send, and process video signals related to video displays 106 and video cameras VC1-VC3; an audio processor to receive, send, and process audio signals related to loudspeaker 108 and microphone arrays MA1-MA3; and a high-level controller to provide overall control. Portions of memory 248 (and the instructions therein) may be integrated with processor 244. In the transmit direction, processor 244 processes audio/video of participants P captured by microphone arrays MA1-MA3/video cameras VC1-VC3, encodes the captured audio/video into data packets using audio/video codecs, and causes the encoded data packets to be transmitted to communication network 103. In the receive direction, processor 244 decodes audio/video from data packets received from communication network 103 and causes the audio/video to be presented to participants P via loudspeaker 108/video displays 106. As used herein, the terms "audio" and "sound" are synonymous and used interchangeably. Also, "voice" and "speech" are synonymous and used interchangeably.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for control logic 250 perform operations described herein.

Control logic 250 includes logic to process the audio/microphone signals and logic to process captured video. Control logic 250 may include AV processor, director, and selector/switch logic modules described below in connection with FIGS. 3A and 3B. In addition, memory 248 stores data 280 used and generated by control logic 250.

Figure 3A:
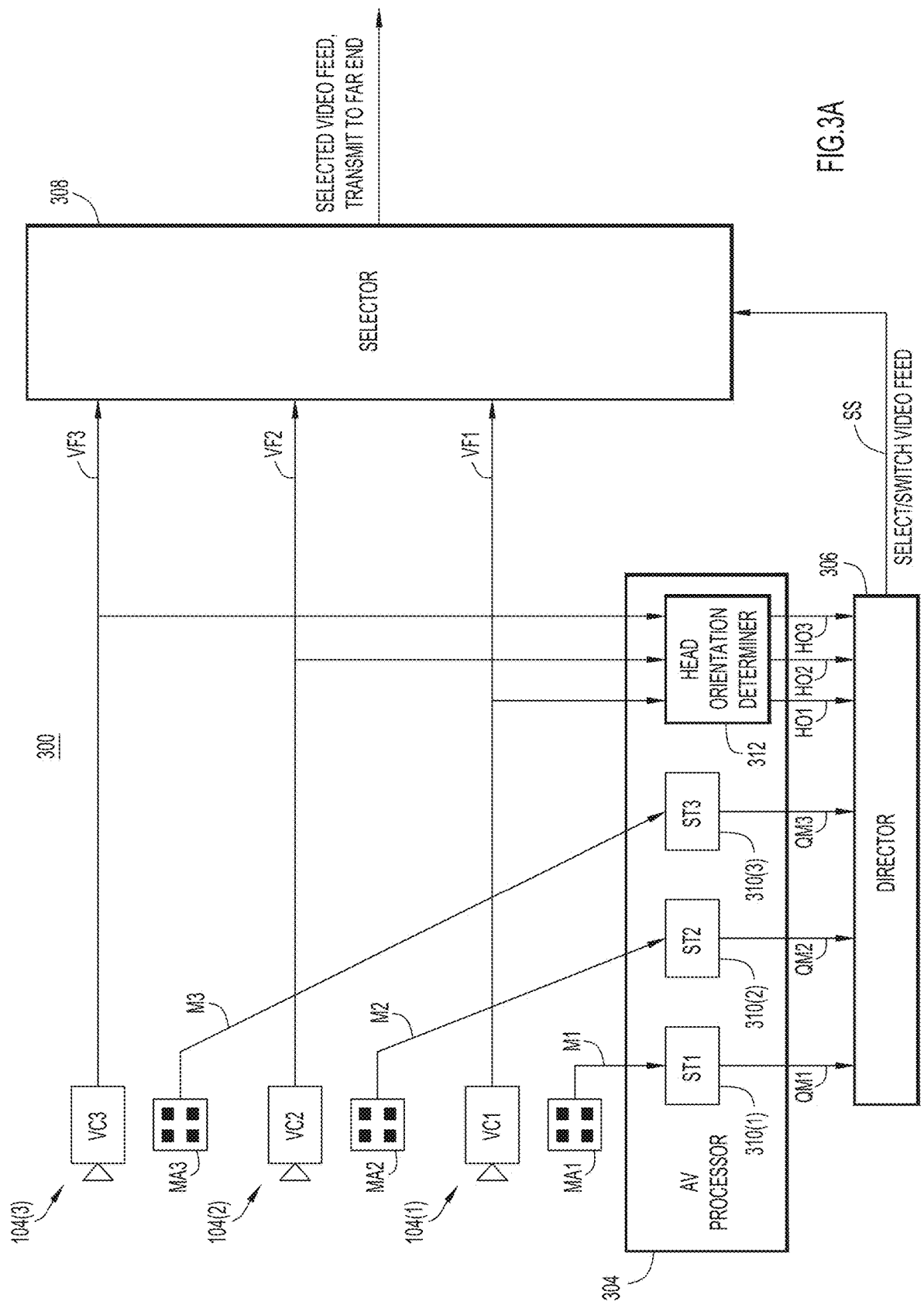
FIG. 3A is a flow diagram of audio-video signal processing performed by various modules of the controller, according to an example embodiment.

With reference to FIG. 3A, there is an example signal processing flow 300 for an AV processor 304, a director 306, and a selector/switch 308 implemented in/by controller 110. AV processor 304 includes individual speaker (i.e., "talker") trackers 310(1) ("ST1"), 310(2) ("ST2"), and 310(3) ("ST3") (collectively referred to as speaker trackers 310) that collectively represent a speaker tracking system of endpoint 102. AV processor 304 also includes a head orientation determiner 312. The example of FIG. 3A shows speaker trackers 310(1), 310(2), and 310(3) and head orientation determiner 312 centrally integrated with controller 110; however, in an alternative example, speaker trackers 310(1), 310(2), and 310(3) and corresponding distributed components of head orientation determiner 312 are integrated and co-located with AV modules 104(1), 104(2), and 104(3), as will be described below in connection with FIG. 3B. AV processor 304 may also include voice and video codecs (not shown), for example. Video cameras VC1, VC2, and VC3 provide their respective video feeds or video signals VF1, VF2, and VF3 to both selector/switch 308 and to head orientation determiner 312. Microphone arrays MA1, MA2, and MA3 provide respective sets of microphone signals M1, M2, and M3 to speaker trackers 310(1), 310(2), and 310(3), respectively.

Head orientation determiner 312 processes video feeds VF1-VF3 to detect a head/face of a participant captured in video by video cameras VC1-VC3, estimates head/face orientations HO1, HO2, and HO3 of the (detected) head/face relative to positions of video cameras VC1, VC2, and VC3, respectively, and provides the head/face orientations to director 306. In a typical video conference, video cameras VC1-VC3 capture video of several participants at a given time. Therefore, head orientation determiner 312 detects a head of each of the participants, and determines a head orientation for each of the detected heads. Thus, each video camera VCi may correspond to several different head orientation for the several participants at the given time. Head/face orientations HO1, HO2, and HO3 are also collectively referred to as "head pose" information.

Speaker trackers 310(1), 310(2), and 310(3) include respective audio correlators that separately correlate respective microphone signal pairs from microphone signal sets M1, M2, and M3 representative of audio from the participant, to produce respective audio quality measurements QM1, QM2, and QM3, corresponding to respective head/face orientations HO1, HO2, and HO3. That is, audio correlator 310(i) correlates a pair of microphone signals from microphone array MAi, to produce audio quality measure QMi corresponding to head/face orientation HOi. Speaker trackers 310(1)-310(3) provide audio quality measures QM1-QM3 to director 306. Speaker trackers 310(1)-310(3) also process their respective microphone signals to estimate a direction/location of a talking participant, i.e., an active talker. When a video conference includes several participants leading to several head orientations (i.e., head orientation estimates) per camera, typically only one of the head orientations corresponds to the active talker. Thus, the position of the active talker determined by the speaker trackers may be used to facilitate selection of the correct head orientation, i.e., the head orientation corresponding to the active talker, for use in subsequent processing.

Director 306 selects a preferred or "selected" video camera (and its corresponding video feed) among video cameras VC1-VC3 (and corresponding video feeds VF10VF3) based on audio quality measures QM1-QM3 and head/face orientations HO1-HO3 corresponding to the audio quality measures. Director 306 provides to selector/switch 308 a selection signal SS indicative of the selected video camera and its corresponding video feed. Responsive to selection signal SS, selector/switch 308 outputs the "selected" video feed corresponding to the selected video camera (referred to as the "active camera") for transmission to communication network 103. For example, when director 306 selects video camera VC1, director 306 generates selection signal SS to cause selector/switch 308 to output video feed VF1 for transmission to communication network 103. This action is referred to as switching the selected video camera (and corresponding video feed) to the active camera (and video feed), and transmitting the corresponding switched video feed to communication network 103.

AV processor 304 performs the following audio processing. Each speaker tracker 310(i) of AV processor 304 performs audio-based speaker (i.e., talker) tracking of audio represented in the set of microphone signals Mi from each microphone array MAi (e.g., MA1, MA2, and MA3), based on an audio processing function referred to as a generalized cross correlation with phase transform (GCCPHAT). GCCPHAT correlates pairs of microphone signals from microphone MAi against each other, to produce a correlation result for the microphone signals and the microphone array. The microphone signals in each pair of microphone signals may be correlated against each other using convolution in the time domain, or multiplication in the frequency domain, for example.

The correlation result typically includes a correlation peak having a peak magnitude. Based on a time position of the correlation peak in the correlation result, a time difference of arrival (TDOA) between the pair of microphone signals can be estimated. By combining several such estimates from several pairs of microphones spatially separated from each other in microphone array MAi, an audio source location (e.g., of a speaking/talking participant) can be robustly estimated by speaker tracker 310(i) in 3D space. For example, estimates from multiple horizontal and vertical pairs of microphones can lead to the audio source location or "location estimate."

Moreover, the peak magnitude (i.e., the "peak value") serves as an audio quality measure of the location estimate. A high peak magnitude (i.e., peak value) indicates high correlation, which indicates that an audio source is robustly detected and located. The peak value tends to be higher for audio sources closer to the microphone array. When participants are speaking, the peak value also tends to be higher for participants facing the microphone array from which the correlation function is derived, due to high frequency directivity of sound energy emanating from the mouth of the speaker/talker, and the effectiveness of high frequency speech sounds in "sharpening" the peak. Accordingly, the peak value serves as a strong or accurate indicator of whether the talker is close to and/or facing the microphone array. In the example of FIG. 3A, quality measures QM1, QM2, and QM3 represent peak values derived from pairs of microphone signals from microphone arrays MA1, MA2, and MA3, respectively.

In some examples, AV processor 304 may performs beam processing to form directional microphone beams at each microphone array MAi. Such microphone beams may optimally detect/receive sound arriving at each microphone array MAi from different directions, and aid in speaker tracking.

Head orientation determiner 312 of AV processor performs the following video processing. Head orientation determiner 312 processes video feeds VF1-VF3 to detect a head/face of a talker among participants P (i.e., of an active talker), and an orientation or pose of the detected head/face of the active talker relative to positions of video cameras VC1-VC3. Head orientation determiner 312 may employ any known or hereafter developed head/face detection and orientation determining techniques to perform the aforementioned operations. In an example, head orientation determiner 312 determines the following parameters:

a. A respective line-of-site from the talker/participant (i.e., the active talker) to each of video cameras VC1, VC2, and VC3 based on the position of the talker and known positions of the video cameras. Participant location estimates derived by speaker trackers 310(1), 310(2), and 310(3) may also be used to compute the lines-of-sight.

b. A direction in which the face of the talker is facing/looking (i.e., the "face direction"). In an example, the face direction may be considered a normal to a plane of the detected face.

c. For each video camera, a respective angle A(i) between the face direction and the respective line-of-sight from the talker to the video camera VC(i). This produces one angle A(i) per video camera. Angle A(i) is the orientation of the face (i.e., "face orientation" or "head pose") with respect/relative to the position of video camera VCi.

As mentioned above, director 306 receives audio quality measures QM1, QM2, and QM3 (the respective peak values) corresponding to microphone arrays MA1, MA2, and MA3, and receives face orientations HO1, HO2, and HO3 of the active talker corresponding to video cameras VC1, VC2, and VC3. Given that microphone array MAi and video camera VCi are co-located in common AV module 104(i), director 306 associates audio quality measure QMi to corresponding video camera VCi, and to corresponding head/face orientation HOi, for further processing. For example, director 306 groups the corresponding parameters/component identifiers into tuples (QMi, HOi, VCi), where i=1, 2, and 3, which may be searched easily. Specifically, director 306 associates audio quality measures QM1, QM2, and QM3 with/to corresponding ones of video cameras VC1, VC2, and VC3, and to corresponding ones of head/face orientations HO1, HO2, and HO3.

Director 306 uses audio quality measures QM1, QM2, and QM3 together with head/face orientations HO1, HO2, and HO3 corresponding to the quality measures to determine which of video cameras VC1, VC2, and VC3 (and their corresponding video feeds) to select and use as the active video camera and video feed. In the ensuing description, "video camera" is replaced with "camera." At a high level, director 306 performs the following audio-video processing. Initially, director 306 determines whether there is a talker, i.e., whether one of participants P is a talker. To do this, director 306 compares each of audio quality measures QM1-QM3 against a magnitude threshold. When at least one of quality measures QM1-QM3 exceeds the magnitude threshold, a talker is detected. Upon detecting the talker, director 306 sets the camera corresponding to the highest quality measure (i.e., peak value) to a new candidate camera to be switched to the active camera. When the new candidate camera is not currently the active camera, director 306 will switch the new candidate camera to the active camera based on the following set of criteria:

a. The talker is facing the new candidate camera within a predetermined tolerance. For example, the face orientation of the talker relative to the new candidate camera is within an orientation range, e.g., ±45°. In other words, the angle between the orientation of the face of the talker (i.e., the direction in which the face is looking) and the line-of-site to the new candidate camera is within the orientation range.

b. The elapsed time since a last camera switch to the active camera is at least a predetermined time period, to avoid switching between active cameras too frequently. In other words, director 306 waits the predetermined time period from the previous switch before switching the new candidate camera to the active camera.

When test (a) fails because the person is not facing the new candidate camera within the predetermined tolerance, i.e., the face orientation is not within the predetermined orientation range, director 306 determines whether the talker is facing a next candidate camera with/corresponding to the second highest peak value (or third highest peak value, or fourth highest peak value, and so on, iteratively). This might occur when the talker is sitting closest to one camera, but is facing a different camera. When the iterative search finds a next candidate camera (i.e., a "found" camera) at which the talker is facing within the predetermine tolerance, director 306 switches the found camera to the active camera.

One of cameras VC1-VC3 may be considered a main camera that is set to a predetermined default camera. When either (i) no talker is detected, or (ii) the talker is not facing any of the cameras within the predetermined tolerance, director 306 selects the main/default camera. The camera selection process is described in further detail in connection with FIG. 4.

Figure 3B:
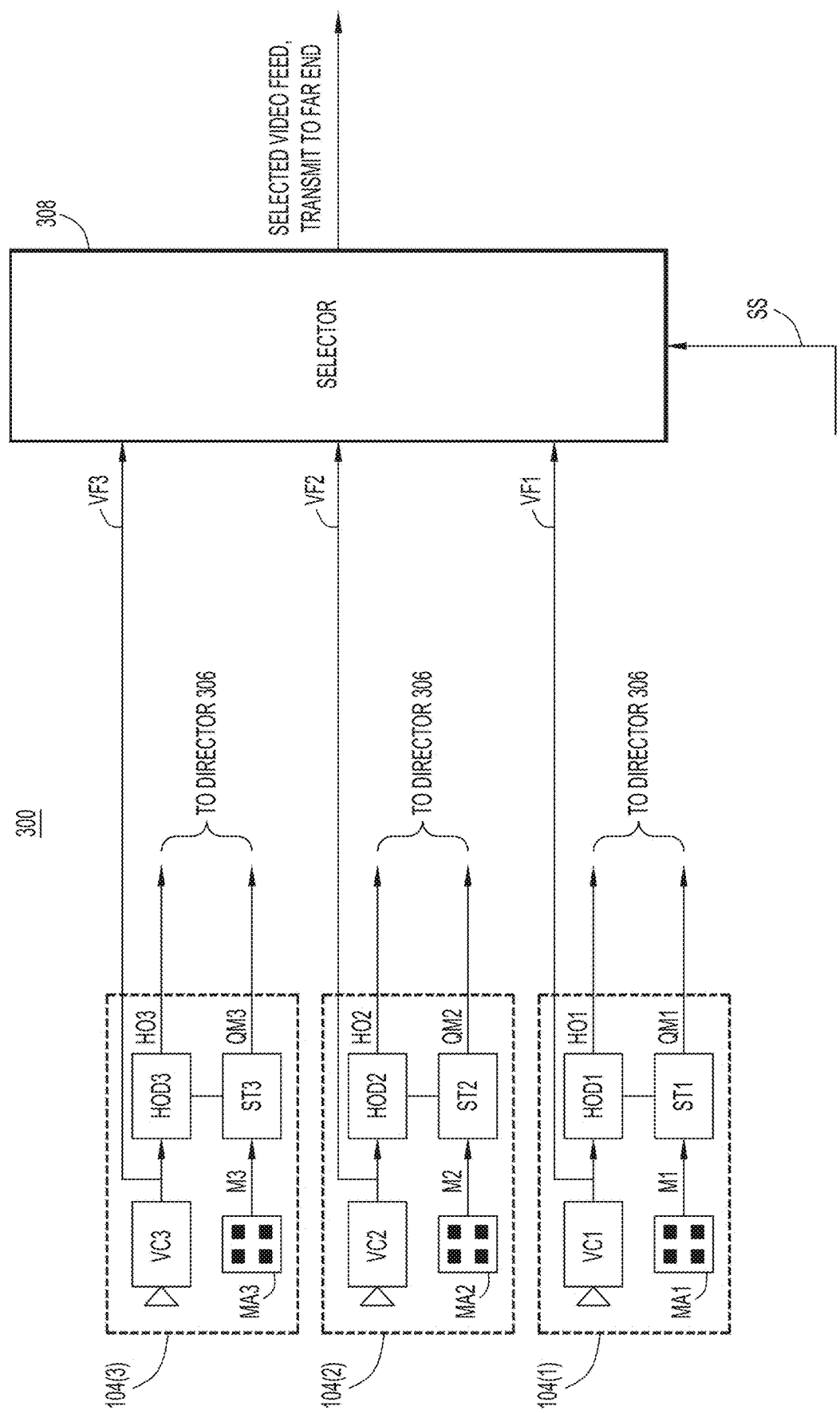
FIG. 3B is a block diagram of the controller when implemented as a distributed controller, according to an example embodiment.

With reference to FIG. 3B, there is a block diagram of portions of EP 102 when controller 110 is implemented as a distributed controller, i.e., in which AV processor 304 of the controller is distributed across AV modules 104(1)-104(3). In the example of FIG. 3B, head orientation determiner (HOD) 312 of AV processor 304 is partitioned into individual HODs HOD1, HOD2, and HOD3 co-located in AV modules 104(1), 104(2), and 104(3) to process video feeds VF1, VF2, and VF3, respectively. Thus, AV modules 104(1), 104(2), and 104(3) incorporate (ST, HOD) module pairs (ST1, HOD1), (ST2, HOD2), and (ST3, HOD3) to process (audio, video) input signal pairs (M1, VF1), (M2, VF2), and (M3, VF3), to produce output signal pairs (QM1, HO1), (QM2, HO2), and (QM3, HO3), respectively. AV modules 104(1), 104(2), and 104(3) provide respective output signal pairs (QM1, HO1), (QM2, HO2), and (QM3, HO3) to director 306.

Figure 4:
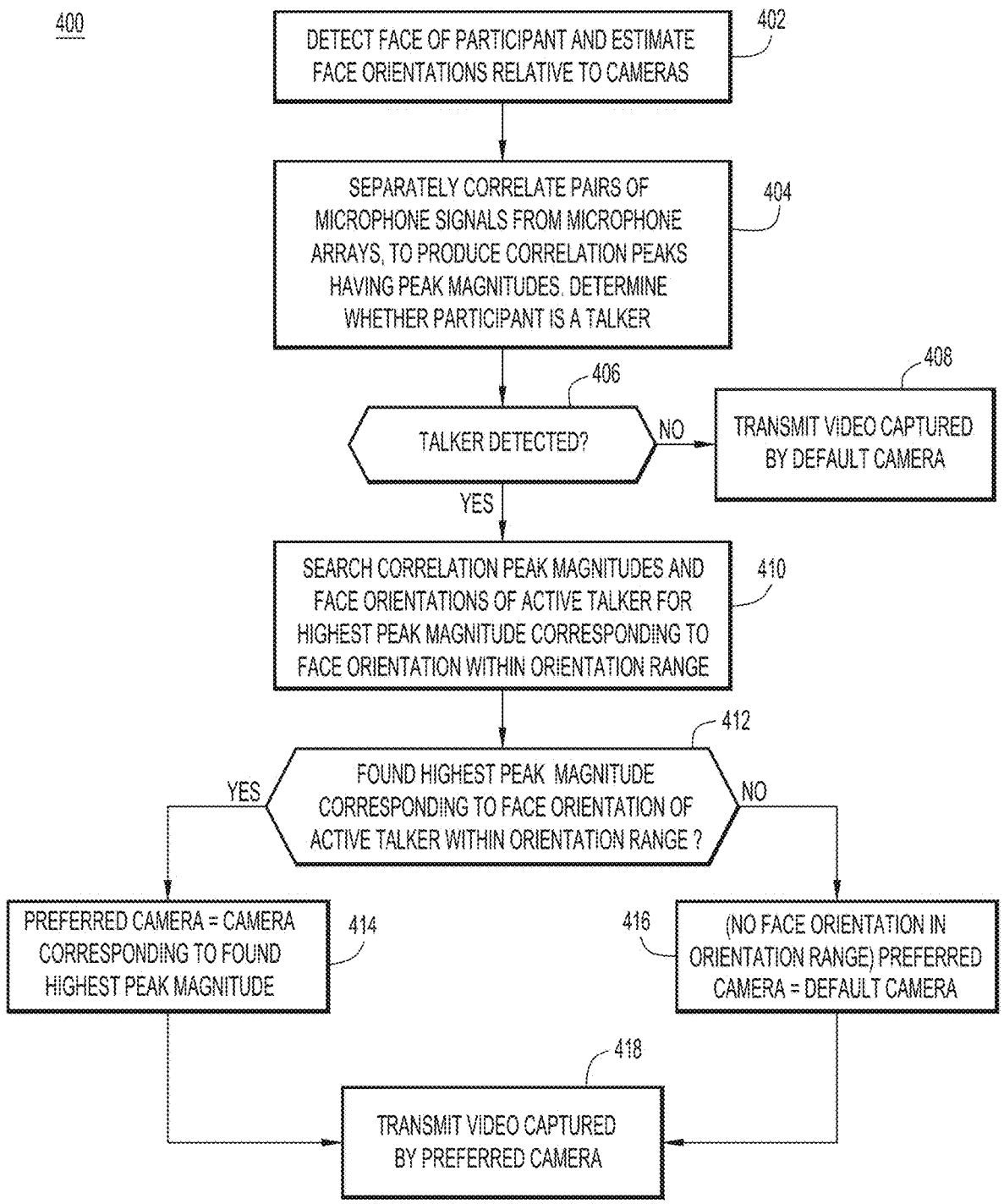
FIG. 4 is a flowchart of a method of selecting a preferred video camera and corresponding video feed to be transmitted to a communication network based on audio quality measures and estimated head orientations for a participant, according to an example embodiment.

FIG. 4 is a flowchart of an example method 400 performed at a video conference system (e.g., endpoint 102) engaged in a video conference with one or more other video conference systems over a communication network. The video conference system includes multiple cameras (e.g., cameras VC1-VC3) and multiple microphone arrays (e.g., microphone arrays MA1-MA3) each co-located with a corresponding one of the multiple cameras. The cameras capture respective video of one or more local participants (e.g., participants P), and provide their captured video to a controller (e.g., controller 110). The video conference system may be configured with information defining one of the cameras as a default camera. The microphone arrays respectively include at least two microphones that convert audio detected from the one or more participants to at least two microphone signals, and provide the at least two microphones signals to a speaker tracking system of the controller. The video conference system is configured with locations/positions of each of the cameras and each of the microphone arrays in a 3D space.

At 402, the controller processes the video from the cameras to detect a face/head of a participant, and estimates orientations of the face/head (i.e., face orientations) relative to positions of the cameras based on video captured by the cameras. In the description below, video captured by the active camera is transmitted to a network.

At 404, the controller separately correlates the at least two microphone signals from each of the microphone arrays against each other using a correlation function, to produce respective correlation peaks for the microphone arrays corresponding to the microphone arrays and the cameras. The correlation peaks have respective peak values.

At 406, the controller determines whether the participant is talking (i.e., whether the participant is an active talker) based on the correlation peaks or using other properties of the microphone signals. When the participant is not talking, flow proceeds to 408, where the controller switches the default camera to the active camera, and transmits video captured by the default/active camera to the communication network. When the participant is talking (i.e., an active talker is detected), flow proceeds to 410

At 410, the controller searches the peak values and the orientations of the face (e.g., searches the above-mentioned tuples) of the active talker for a highest peak value corresponding to an orientation of the face within an orientation range that is predetermined.

At 412, the controller determines whether the search found any (highest) peak value corresponding to an orientation within the orientation range (i.e., whether the face of the active talker is looking towards any of the cameras). When the search finds the highest peak value corresponding to the orientation of the face of the active talker within the orientation range, flow proceeds to 414. On the other hand, when the search does not find the (highest) peak value corresponding to the orientation of the face of the active talker within the orientation range (i.e., when none of the orientations of the face of the active talker relative to the different cameras is within the orientation range), flow proceeds to 416.

At 414, the controller selects the one of the cameras that corresponds to the highest peak value that is found as the preferred camera, and flow proceeds to 418.

At 416, the controller selects the default camera as the preferred camera, and flow proceeds to 418.

At 418, the controller switches the preferred camera to the active camera at a time T1, and transmits video captured by the active camera to the communication network. In a situation where a previously preferred camera (that is different from the preferred camera) was switched to the active camera at a prior time T2, the controller may wait a predetermined time period from the prior time T2 before switching the preferred camera to the active camera.

In some embodiments, the at least two microphone signals include multiple pairs of microphone signals from each microphone array, and separately correlating at 404 further includes separately correlating each of the multiple pairs of the microphone signals against each other to produce multiple correlation peaks per microphone array. In this case, determining at 412 may include determining the preferred camera based on the multiple correlation peaks per microphone array and the orientations of the face relative to the cameras. The multiple correlation peaks per microphone array may be (i) combined (e.g., averaged) to increase robustness of location/position estimates for the active talker, or (ii) based on microphone array geometry/layout, used to estimate talker position in 2D or 3D space.

Figure 5:
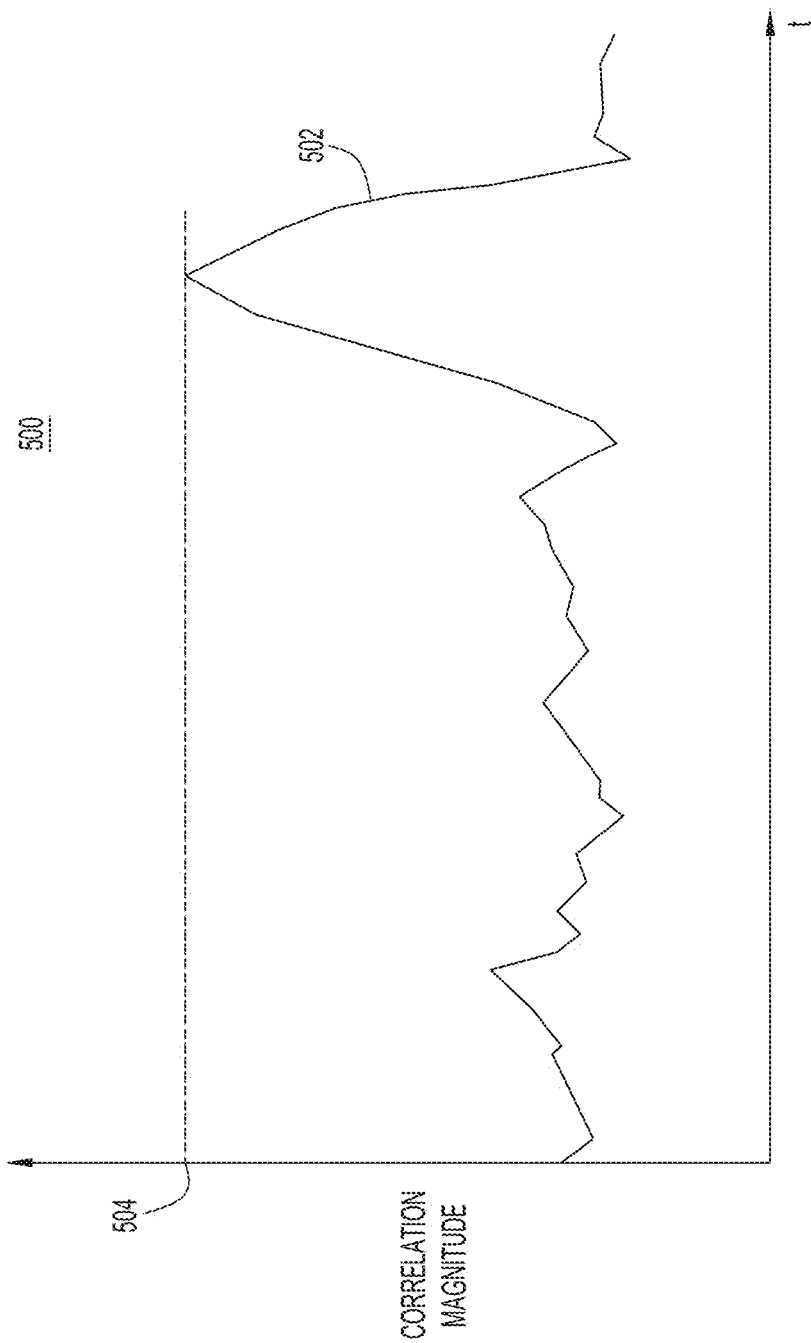
FIG. 5 is a magnitude-time graph for a correlation result when two microphone signals are correlated with each other, according to an example embodiment.

With reference to FIG. 5, there is an illustration of an example correlation magnitude vs. time graph of a correlation result 500 produced by correlating two microphone signals. Correlation result 500 includes a correlation peak 502 having a peak value 504.

Figure 6:
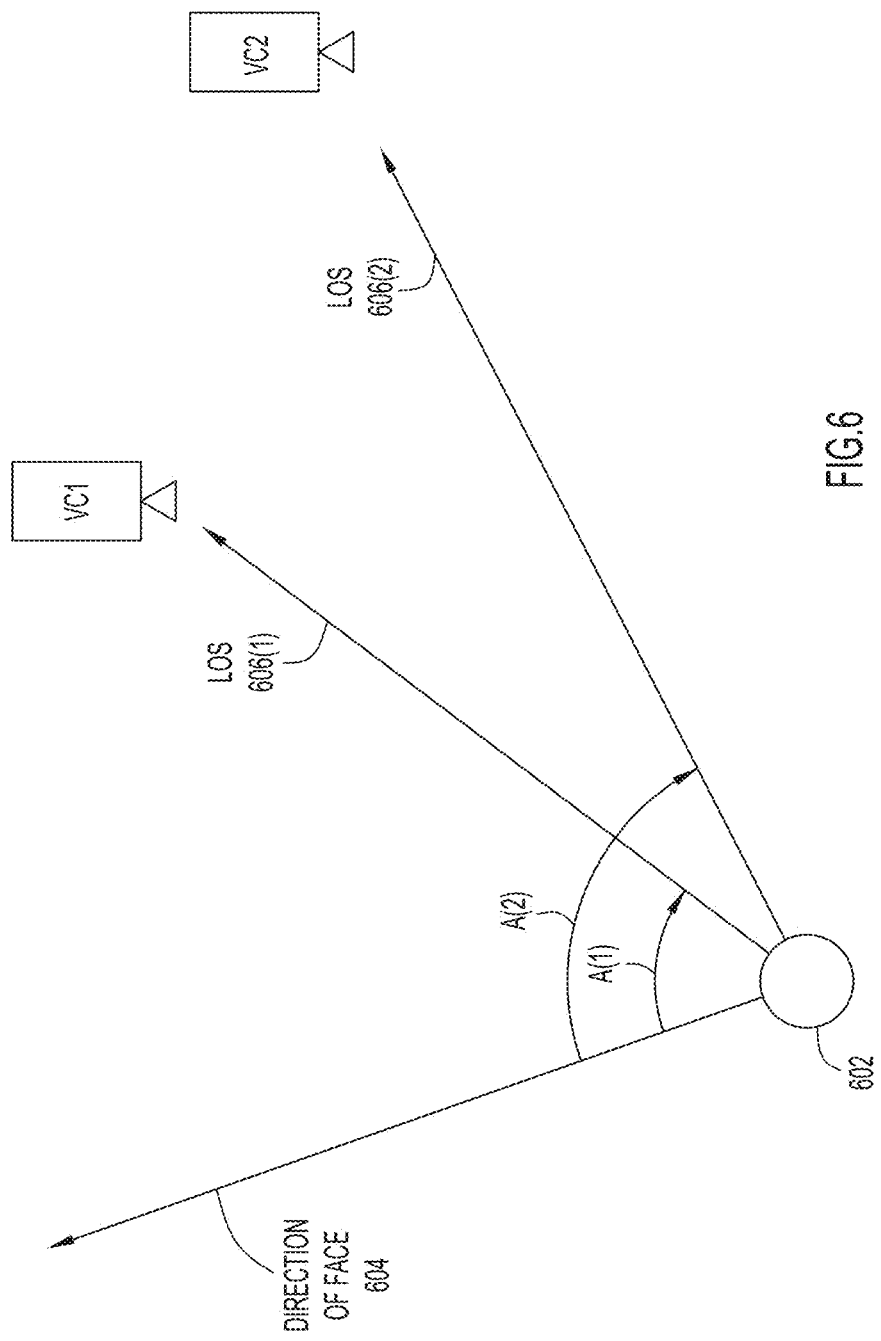
FIG. 6 is an illustration of estimated head/face orientations relative to respective video cameras, according to an example embodiment.

With reference to FIG. 6, there is an illustration of orientations A(1), A(2) of a face 602 (i.e., head pose) relative to cameras VC1, VC2 that may be computed by head orientation determiner 312. The face is determined to be looking/facing a direction 604. Line-of-site (LOS) 606(1) connects face 602 to camera VC1, and LOS 606(2) connects the face to camera VC2. Orientations A(1), A(2) represents angles between direction 604 and LOSs 606(1), 606(2), respectively.

Figure 7:
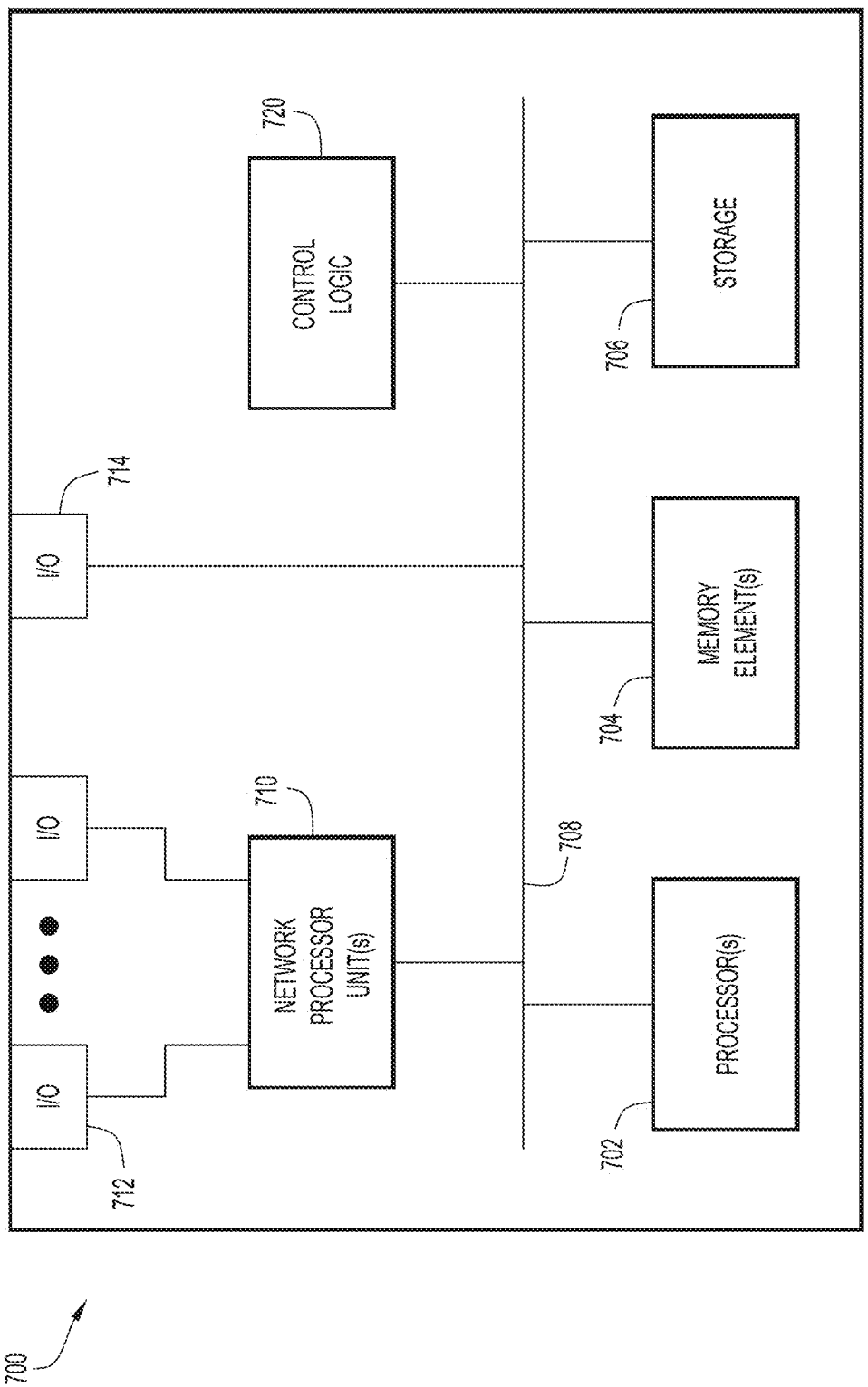
FIG. 7 illustrates a hardware block diagram of a computing device that may perform functions presented herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any entity/entities as discussed for the techniques depicted in connection with FIGS. 1-6 in order to perform operations of the various techniques discussed herein. For example, computing device 700, or various components of the computing device, may represent endpoint 102 and controller 110.

In at least one embodiment, the computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In some aspects, the techniques described herein relate to a method performed by a video conference system having cameras and microphone arrays each co-located with a corresponding one of the cameras, the method including: detecting a face of a participant, and estimating orientations of the face relative to the cameras based on video captured by the cameras; receiving, from each of the microphone arrays, at least two microphone signals that represent detected audio from the participant; separately correlating the at least two microphone signals from each of the microphone arrays against each other using a correlation function, to produce correlation peaks for the microphone arrays corresponding to the microphone arrays and the cameras; determining a preferred camera among the cameras based on the correlation peaks and the orientations of the face relative to the cameras; and transmitting the video captured by the preferred camera to a network.

In some aspects, the techniques described herein relate to a method, wherein the correlation peaks have peak values, and determining includes: searching the peak values and the orientations of the face for a highest peak value corresponding to an orientation of the face within an orientation range; and when searching finds the highest peak value corresponding to the orientation of the face within the orientation range, selecting, as the preferred camera, a camera among the cameras corresponding to the highest peak value.

In some aspects, the techniques described herein relate to a method, wherein determining further includes: when none of the orientations of the face are within the orientation range, selecting a default camera among the cameras as the preferred camera.

In some aspects, the techniques described herein relate to a method, further including: determining whether the participant is talking based on the correlation peaks; and when the participant is talking, performing determining and transmitting.

In some aspects, the techniques described herein relate to a method, further including: when the participant is not talking, not performing determining and transmitting, and transmitting the video captured by a default camera among the cameras.

In some aspects, the techniques described herein relate to a method, wherein: the correlation function includes a generalized cross correlation with phase transform.

In some aspects, the techniques described herein relate to a method, wherein: the at least two microphone signals include multiple pairs of microphone signals from each microphone array; separately correlating includes separately correlating each of the multiple pairs of the microphone signals against each other to produce multiple correlation peaks per microphone array; and determining includes determining the preferred camera based on the multiple correlation peaks per microphone array and the orientations of the face relative to the cameras.

In some aspects, the techniques described herein relate to a method, further including: at a first time prior to transmitting the video captured by the preferred camera, transmitting the video captured by a previously preferred camera to the network; and after determining, waiting a predetermined time period before transmitting the video captured by the preferred camera.

In some aspects, the techniques described herein relate to an apparatus including: cameras and microphone arrays each co-located with a corresponding one of the cameras; and a processor coupled to the cameras and the microphone arrays and configured to perform: detecting a face of a participant, and estimating orientations of the face relative to the cameras based on video captured by the cameras; receiving, from each of the microphone arrays, at least two microphone signals that represent detected audio from the participant; separately correlating the at least two microphone signals from each of the microphone arrays against each other using a correlation function, to produce correlation peaks for the microphone arrays corresponding to the microphone arrays and the cameras; determining a preferred camera among the cameras based on the correlation peaks and the orientations of the face relative to the cameras; and transmitting the video captured by the preferred camera to a network.

In some aspects, the techniques described herein relate to an apparatus, wherein the correlation peaks have peak values, and the processor is configured to perform determining by: searching the peak values and the orientations of the face for a highest peak value corresponding to an orientation of the face within an orientation range; and when searching finds the highest peak value corresponding to the orientation of the face within the orientation range, selecting, as the preferred camera, a camera among the cameras corresponding to the highest peak value.

In some aspects, the techniques described herein relate to an apparatus, wherein the processor is further configured to perform determining by: when none of the orientations of the face are within the orientation range, selecting a default camera among the cameras as the preferred camera.

In some aspects, the techniques described herein relate to an apparatus, wherein the processor is further configured to perform: determining whether the participant is talking based on the correlation peaks; and when the participant is talking, performing determining and transmitting.

In some aspects, the techniques described herein relate to an apparatus, wherein the processor is further configured to perform: when the participant is not talking, not performing determining and transmitting, and transmitting the video captured by a default camera among the cameras.

In some aspects, the techniques described herein relate to an apparatus, wherein: the correlation function includes a generalized cross correlation with phase transform.

In some aspects, the techniques described herein relate to an apparatus, wherein: the at least two microphone signals include multiple pairs of microphone signals from each microphone array; the processor is configured to perform separately correlating by separately correlating each of the multiple pairs of the microphone signals against each other to produce multiple correlation peaks per microphone array; and the processor is configured to perform determining by determining the preferred camera based on the multiple correlation peaks per microphone array and the orientations of the face relative to the cameras.

In some aspects, the techniques described herein relate to an apparatus, wherein the processor is further configured to perform: at a first time prior to transmitting the video captured by the preferred camera, transmitting the video captured by a previously preferred camera to the network; and after determining, waiting a predetermined time period before transmitting the video captured by the preferred camera.

In some aspects, the techniques described herein relate to a non-transitory computer readable medium encoded with instruction that, when executed by a processor of a video conference system having cameras and microphone arrays each co-located with a corresponding one of the cameras, cause the processor to perform: detecting a face of a participant, and estimating orientations of the face relative to the cameras based on video captured by the cameras; receiving, from each of the microphone arrays, at least two microphone signals that represent detected audio from the participant; separately correlating the at least two microphone signals from each of the microphone arrays against each other using a correlation function, to produce correlation peaks for the microphone arrays corresponding to the microphone arrays and the cameras; determining a preferred camera among the cameras based on the correlation peaks and the orientations of the face relative to the cameras; and transmitting the video captured by the preferred camera to a network.

In some aspects, the techniques described herein relate to a non-transitory computer readable medium, wherein the correlation peaks have peak values, and wherein the instructions to cause the processor to perform determining include instructions to cause the processor to perform: searching the peak values and the orientations of the face for a highest peak value corresponding to an orientation of the face within an orientation range; and when searching finds the highest peak value corresponding to the orientation of the face within the orientation range, selecting, as the preferred camera, a camera among the cameras corresponding to the highest peak value.

In some aspects, the techniques described herein relate to a non-transitory computer readable medium, wherein the instructions to cause the processor to perform determining further include instructions to cause the processor to perform: when none of the orientations of the face are within the orientation range, selecting a default camera among the cameras as the preferred camera.

In some aspects, the techniques described herein relate to a non-transitory computer readable medium, further including instructions to cause the processor to perform: determining whether the participant is talking based on the correlation peaks; and when the participant is talking, performing determining and transmitting.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Various modifications and structural changes may be made therein without departing from the scope of the concepts described herein and within the scope and range of equivalents of the claims.

What is claimed is:

1. A method performed by a video conference system having cameras and microphone arrays each co-located with a corresponding one of the cameras, the method comprising:
    detecting a face of a participant, and estimating orientations of the face relative to the cameras, based on video captured by the cameras;
    receiving, from each microphone array, at least two microphone signals that represent detected audio from the participant;
    separately correlating the at least two microphone signals from each microphone array against each other using a correlation function to produce a correlation peak that indicates a time difference of arrival between the at least two microphone signals, wherein separately correlating produces correlation peaks for corresponding ones of the microphone arrays;
determining a preferred camera among the cameras based on the correlation peaks and the orientations of the face relative to the cameras; and
transmitting the video captured by the preferred camera to a network.

2. The method of claim 1, wherein the correlation peaks have peak values, and determining includes:
searching the peak values and the orientations of the face for a highest peak value corresponding to an orientation of the face within an orientation range; and
when searching finds the highest peak value corresponding to the orientation of the face within the orientation range, selecting, as the preferred camera, a camera among the cameras corresponding to the highest peak value.

3. The method of claim 2, wherein determining further includes:
when none of the orientations of the face are within the orientation range, selecting a default camera among the cameras as the preferred camera.

4. The method of claim 1, further comprising:
determining whether the participant is talking based on the correlation peaks; and
when the participant is talking, performing determining and transmitting.

5. The method of claim 4, further comprising:
when the participant is not talking, not performing determining and transmitting, and transmitting the video captured by a default camera among the cameras.

6. The method of claim 1, wherein:
the correlation function includes a generalized cross correlation with phase transform.

7. The method of claim 1, wherein:
the at least two microphone signals include multiple pairs of microphone signals from each microphone array;
separately correlating includes separately correlating each of the multiple pairs of the microphone signals against each other to produce multiple correlation peaks per microphone array; and
determining includes determining the preferred camera based on the multiple correlation peaks per microphone array and the orientations of the face relative to the cameras.

8. The method of claim 1, further comprising:
at a first time prior to transmitting the video captured by the preferred camera, transmitting the video captured by a previously preferred camera to the network; and
after determining, waiting a predetermined time period before transmitting the video captured by the preferred camera.

9. An apparatus comprising:
cameras and microphone arrays each co-located with a corresponding one of the cameras; and
a processor coupled to the cameras and the microphone arrays and configured to perform:
detecting a face of a participant, and estimating orientations of the face relative to the cameras, based on video captured by the cameras;
receiving, from each microphone array, at least two microphone signals that represent detected audio from the participant;
separately correlating the at least two microphone signals from each microphone array against each other using a correlation function to produce a correlation peak that indicates a time difference of arrival between the at least two microphone signals, wherein separately correlating produces correlation peaks for corresponding ones of the microphone arrays;
determining a preferred camera among the cameras based on the correlation peaks and the orientations of the face relative to the cameras; and
transmitting the video captured by the preferred camera to a network.

10. The apparatus of claim 9, wherein the correlation peaks have peak values, and the processor is configured to perform determining by:
searching the peak values and the orientations of the face for a highest peak value corresponding to an orientation of the face within an orientation range; and
when searching finds the highest peak value corresponding to the orientation of the face within the orientation range, selecting, as the preferred camera, a camera among the cameras corresponding to the highest peak value.

11. The apparatus of claim 10, wherein the processor is further configured to perform determining by:
when none of the orientations of the face are within the orientation range, selecting a default camera among the cameras as the preferred camera.

12. The apparatus of claim 9, wherein the processor is further configured to perform:
determining whether the participant is talking based on the correlation peaks; and
when the participant is talking, performing determining and transmitting.

13. The apparatus of claim 12, wherein the processor is further configured to perform:
when the participant is not talking, not performing determining and transmitting, and transmitting the video captured by a default camera among the cameras.

14. The apparatus of claim 9, wherein:
the correlation function includes a generalized cross correlation with phase transform.

15. The apparatus of claim 9, wherein:
the at least two microphone signals include multiple pairs of microphone signals from each microphone array;
the processor is configured to perform separately correlating by separately correlating each of the multiple pairs of the microphone signals against each other to produce multiple correlation peaks per microphone array; and
the processor is configured to perform determining by determining the preferred camera based on the multiple correlation peaks per microphone array and the orientations of the face relative to the cameras.

16. The apparatus of claim 9, wherein the processor is further configured to perform:
at a first time prior to transmitting the video captured by the preferred camera, transmitting the video captured by a previously preferred camera to the network; and
after determining, waiting a predetermined time period before transmitting the video captured by the preferred camera.

17. A non-transitory computer readable medium encoded with instructions that, when executed by a processor of a video conference system having cameras and microphone arrays each co-located with a corresponding one of the cameras, cause the processor to perform:
detecting a face of a participant, and estimating orientations of the face relative to the cameras, based on video captured by the cameras;

receiving, from each microphone array, at least two microphone signals that represent detected audio from the participant;

separately correlating the at least two microphone signals from each microphone array against each other using a correlation function to produce a correlation peak that indicates a time difference of arrival between the at least two microphone signals, wherein separately correlating produces correlation peaks for corresponding ones of the microphone arrays;

determining a preferred camera among the cameras based on the correlation peaks and the orientations of the face relative to the cameras; and transmitting the video captured by the preferred camera to a network.

18. The non-transitory computer readable medium of claim 17, wherein the correlation peaks have peak values, and wherein the instructions to cause the processor to perform determining include instructions to cause the processor to perform:

searching the peak values and the orientations of the face for a highest peak value corresponding to an orientation of the face within an orientation range; and when searching finds the highest peak value corresponding to the orientation of the face within the orientation range, selecting, as the preferred camera, a camera among the cameras corresponding to the highest peak value.

19. The non-transitory computer readable medium of claim 18, wherein the instructions to cause the processor to perform determining further include instructions to cause the processor to perform:

when none of the orientations of the face are within the orientation range, selecting a default camera among the cameras as the preferred camera.

20. The non-transitory computer readable medium of claim 17, further comprising instructions to cause the processor to perform:

determining whether the participant is talking based on the correlation peaks; and when the participant is talking, performing determining and transmitting.

* * * * *